United States Patent
Kim

(10) Patent No.: US 9,548,649 B2
(45) Date of Patent: Jan. 17, 2017

(54) DC-DC CONVERTER AND DISPLAY DEVICE INCLUDING THE SAME

(71) Applicant: Samsung Display Co., Ltd., Yongin, Gyeonggi-do (KR)

(72) Inventor: Jin-Woo Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 64 days.

(21) Appl. No.: 14/535,268

(22) Filed: Nov. 6, 2014

(65) Prior Publication Data
US 2015/0171732 A1    Jun. 18, 2015

(30) Foreign Application Priority Data

Dec. 13, 2013   (KR) .................. 10-2013-0155305

(51) Int. Cl.
| | |
|---|---|
| *H02M 1/096* | (2006.01) |
| *G09G 3/32* | (2016.01) |
| *H02M 3/158* | (2006.01) |
| *H02M 3/156* | (2006.01) |
| *H02M 3/335* | (2006.01) |

(52) U.S. Cl.
CPC .......... *H02M 1/096* (2013.01); *G09G 3/3225* (2013.01); *H02M 3/156* (2013.01); *H02M 3/158* (2013.01); *H02M 3/33507* (2013.01); *G09G 2300/0809* (2013.01); *G09G 2310/0278* (2013.01)

(58) Field of Classification Search
None
See application file for complete search history.

(56) References Cited

U.S. PATENT DOCUMENTS

| | | | |
|---|---|---|---|
| 5,912,552 A | 6/1999 | Tateishi | |
| 7,598,715 B1 | 10/2009 | Hariman et al. | |
| 7,705,579 B1 * | 4/2010 | Hariman | H02M 3/156 323/284 |
| 2009/0184701 A1 | 7/2009 | Yen | |
| 2009/0273326 A1 | 11/2009 | Lipcsei | |
| 2009/0284992 A1 | 11/2009 | Kenly et al. | |

(Continued)

FOREIGN PATENT DOCUMENTS

| | | |
|---|---|---|
| KR | 10-2007-0058913 A | 6/2007 |
| KR | 10-2013-0051363 A | 5/2013 |

OTHER PUBLICATIONS

EPO Search Report dated Jun. 26, 2015, for corresponding European Patent application 14194863.8, (7 pages).

*Primary Examiner* — Joseph Haley
*Assistant Examiner* — Emily Frank
(74) *Attorney, Agent, or Firm* — Lewis Roca Rothgerber Christie LLP

(57) ABSTRACT

A DC-DC converter includes: a converter including a first transistor, a second transistor and an inductor; a first gate driver and a second gate driver configured to respectively control the first and second transistors; a pulse width modulation (PWM) control circuit configured to output a PWM signal to the first gate driver and a first logic circuit, the first logic circuit configured to receive the PWM signal and a second logic signal, and to output a first logic signal to the second gate driver; and a second logic circuit configured to receive a first control signal and a second control signal, and to output the second logic signal to the first logic circuit.

19 Claims, 4 Drawing Sheets

(56) References Cited

U.S. PATENT DOCUMENTS

| | | | |
|---|---|---|---|
| 2012/0229113 A1* | 9/2012 | Houston | H02M 3/1588 |
| | | | 323/288 |
| 2013/0009938 A1* | 1/2013 | Hwang | G09G 3/348 |
| | | | 345/212 |
| 2013/0113775 A1 | 5/2013 | Seo | |
| 2014/0232360 A1* | 8/2014 | Dally | G05F 1/563 |
| | | | 323/266 |
| 2016/0005355 A1* | 1/2016 | Wen | G09G 3/2025 |
| | | | 345/205 |

* cited by examiner

DC-DC CONVERTER AND DISPLAY DEVICE INCLUDING THE SAME

CROSS-REFERENCE TO RELATED APPLICATION

This application claims priority to and the benefit of Korean Patent Application No. 10-2013-0155305, filed on Dec. 13, 2013, in the Korean Intellectual Property Office, the entire content of which is incorporated herein by reference in its entirety.

BACKGROUND

1. Field

An aspect of the present invention relates to a DC-DC converter and a display device including the same.

2. Description of the Related Art

Recently, there have been developed various types of display devices capable of reducing the weight and volume associated with cathode ray tubes, the use of which is disadvantageous. The display devices include liquid crystal display devices, field emission display devices, plasma display panels, organic light emitting display devices, and the like.

A converter for supplying a driving voltage may be provided in such display devices.

When a load decreases, a related art converter operates in a discontinuous conduction mode (DCM) in order to reduce power consumption.

In this case, there exists, however, a problem in that the output voltage of the converter is not quickly changed.

Particularly, in a case of a buck-converter, it is difficult to quickly drop the output voltage of the buck-converter in the DCM.

SUMMARY

According to an aspect of embodiments of the present invention, there is provided a DC-DC converter including: a converter including a first transistor, a second transistor and an inductor; a first gate driver and a second gate driver configured to respectively control the first and second transistors; a pulse width modulation (PWM) control circuit configured to output a PWM signal to the first gate driver and a first logic circuit, the first logic circuit configured to receive the PWM signal and a second logic signal, and to output a first logic signal to the second gate driver; and a second logic circuit configured to receive a first control signal and a second control signal, and to output the second logic signal to the first logic circuit.

The DC-DC converter may further include a first comparator configured to compare a first reference value with current in the inductor, and to output, to the second logic circuit, the first control signal based on a compared result of the first comparator.

The first comparator is configured to output the first control signal having a high logic level when the current in the inductor is lower than the first reference value, and to output the first control signal having a low logic level when the current in the inductor is higher than the first reference value.

The DC-DC converter may further include a current sensor configured to measure current in the inductor, and to supply the measured current to the first comparator.

The DC-DC converter may further include a controller configured to output the second control signal to the second logic circuit.

A low current period in which the current in the inductor is lower than the first reference value may include a first light load mode period, a synchronization mode period and a second light load mode period, which are sequentially performed.

During the first light load mode period, the first transistor may be configured to repetitively perform an on-off operation, and the second transistor may be configured to be in a turn-off state, wherein, during the synchronization mode period, the first and second transistors are configured to be alternately turned on, and wherein, during the second light load mode period, the first transistor is configured to repetitively perform the on-off operation, and the second transistor is configured to be in the turn-off state.

The controller may be configured to output the second control signal having a high logic level during the first and second light load mode periods, and to output the second control signal having a low logic level during the synchronization mode period.

The first logic circuit may include a NOR gate.

The second logic circuit may include an AND gate.

The controller may include a second comparator configured to compare a first input signal input to a first input terminal thereof with a second input signal input to a second input terminal thereof, and to supply, to the second logic circuit, the second control signal based on a compared result of the second comparator.

The second comparator may be configured to output the second control signal having a low logic level when a level of the first input signal is lower than that of the second input signal, and to output the second control signal having a high logic level when a level of the first input signal is equal to that of the second input signal.

The controller may further include a first delay buffer configured to receive the first input signal to delay the received first input signal by a period and to output the delayed signal, and a second delay buffer configured to receive a signal output from the first delay buffer to delay the received signal by a period and to output the delayed signal to the second input terminal of the second comparator.

The controller may further include a capacitor coupled to the second input terminal of the second comparator.

The converter may be configured to receive an input voltage at an input terminal thereof, and to output a first voltage to an output terminal thereof.

The first transistor may be coupled between the input terminal and a first node, wherein the second transistor may be coupled between the first node and ground, and wherein the inductor may be coupled between the first node and the output terminal.

The DC-DC converter may further include: a voltage divider configured to generate a feedback voltage by dividing the first voltage, and to supply the generated feedback voltage to an error amplifier, the error amplifier configured to supply, to the PWM control circuit, an error signal based on a difference between the feedback voltage and a second reference value.

The DC-DC converter may further include a voltage controlled current source configured to control the feedback voltage according to the signal output from the first delay buffer.

The voltage divider may include a first resistor coupled between the output terminal of the converter and a second node, and a second resistor coupled between the second node and ground, and wherein the error amplifier may include a first input terminal to which the second reference value is input, and a second input terminal coupled to the second node.

The voltage controlled current source may include a control transistor coupled between the second node and a third node, a resistor coupled between the third node and ground, and a control amplifier configured to control an amount of current from the control transistor according to the signal output from the first delay buffer.

The control amplifier may include a first input terminal coupled to the output terminal of the first delay buffer, and a second input terminal coupled to the third node.

The converter may further include a first diode coupled between the input terminal of the converter and the first node, and a second diode coupled between the first node and ground.

According to another aspect of embodiments of the present invention, there is provided a display unit including a plurality of pixels; a scan driver for providing scan signals to the pixels; a data driver for providing data signals to the pixels in synchronization with the scan signals; and a DC-DC converter for providing power to the display unit, the DC-DC converter including: a converter including a first transistor, a second transistor and an inductor; a first gate driver and a second gate driver configured to respectively control the first and second transistors; a pulse width modulation (PWM) control circuit configured to output a PWM signal to the first gate driver and a first logic circuit, the first logic circuit configured to receive the PWM signal and a second logic signal, and to output a first logic signal to the second gate driver; and a second logic circuit configured to receive a first control signal and a second control signal, and to output the second logic signal to the first logic circuit.

BRIEF DESCRIPTION OF THE DRAWINGS

Example embodiments of the present invention will now be described more fully hereinafter with reference to the accompanying drawings; however, the present invention may be embodied in different forms and should not be construed as being limited to the embodiments set forth herein. Rather, these embodiments are provided so that this disclosure will be thorough and complete, and will fully convey the scope of the example embodiments of the present invention to those skilled in the art.

In the drawing figures, dimensions may be exaggerated for clarity of illustration. It will be understood that when an element is referred to as being "between" two elements, it may be the only element between the two elements, or one or more intervening elements may also be present. Like reference numerals refer to like elements throughout.

DETAILED DESCRIPTION

Figure 1:
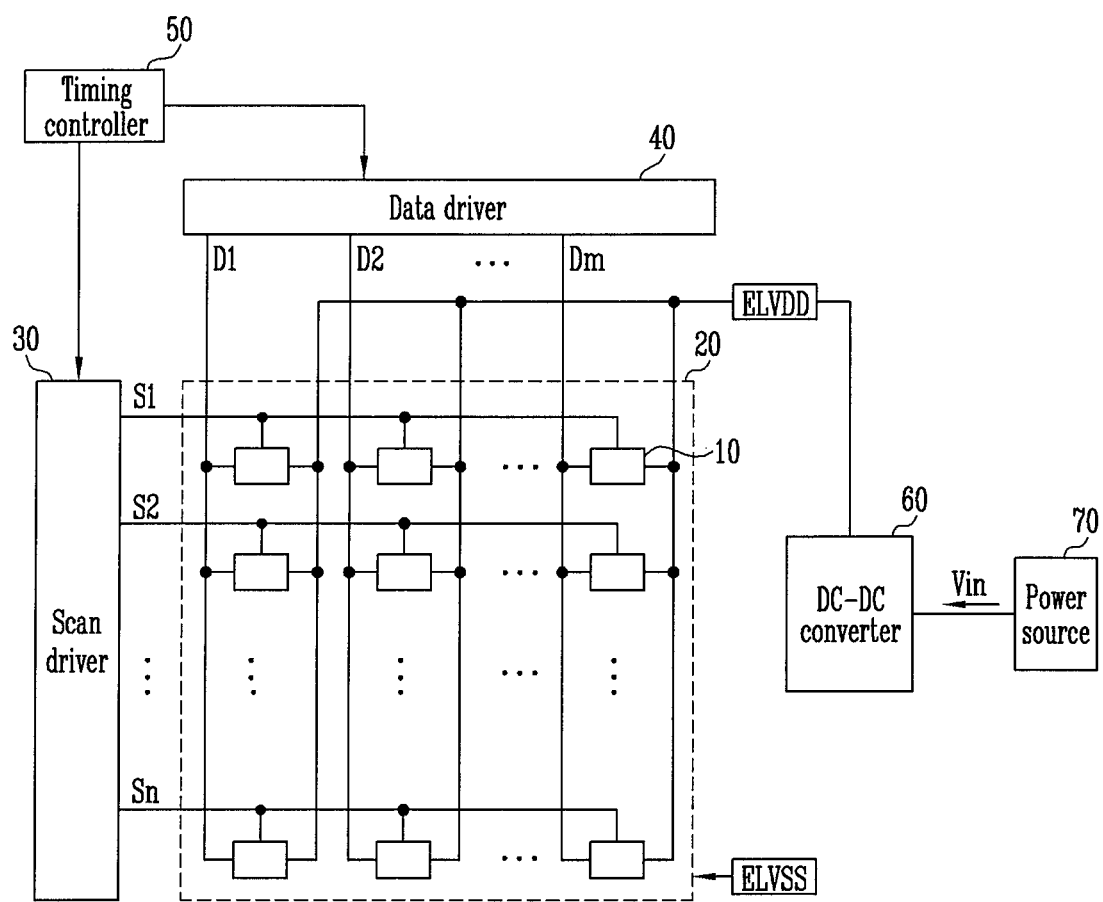
FIG. 1 is a diagram illustrating a display device according to an embodiment of the present invention.

Hereinafter, certain example embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention may be omitted for clarity. Also, like reference numerals refer to like elements throughout.

FIG. 1 is a diagram illustrating a display device according to an embodiment of the present invention.

Referring to FIG. 1, the display device according to this embodiment may include a pixel unit 20 configured to include a plurality of pixels 10 coupled to scan lines S1 to Sn and data lines D1 to Dm, a scan driver 30 configured to supply a scan signal to each pixel 10 through the scan lines S1 to Sn, a data driver 40 configured to supply a data signal to each pixel 10 through the data lines D1 to Dm, and a DC-DC converter 60 configured to supply a first voltage ELVDD to each pixel 10.

The display device according to this embodiment may also include a timing controller 50 configured to control the scan driver 30 and the data driver 40, and a separate DC-DC converter configured to supply a second voltage ELVSS to each pixel 10.

Each pixel 10 receiving the first and second voltages ELVDD and ELVSS may generate light corresponding to a data signal in accordance with current flowing from the first voltage ELVDD to the second voltage ELVSS via an organic light emitting diode.

The scan driver 30 may generate scan signals under (e.g., in accordance with) the control of the timing controller 50, and supply the generated scan signals to the scan lines S1 to Sn.

The data driver 40 may generate data signals under (e.g., in accordance with) the control of the timing controller 50, and supply the generated data signals to the data lines D1 to Dm.

When a scan signal is supplied to a specific scan line, pixels 10 coupled to the specific scan line may receive a data signal supplied from the data lines D1 to Dm, and accordingly, each pixel 10 can emit light with luminance corresponding to the received data signal.

The DC-DC converter 60 may receive an input voltage Vin supplied from the power source 70, and generate the first voltage ELVDD supplied to each pixel 10 by converting the input voltage Vin.

In the described embodiment, the first voltage ELVDD is a positive voltage (e.g., is set as a positive voltage), and the second voltage ELVSS is a negative voltage (e.g., is set as a negative voltage).

The power source 70 may be a battery which provides a DC power source or a rectifying device which converts an AC power source into a DC power source and outputs the converted DC power source. However, the present invention is not limited thereto.

Figure 2:
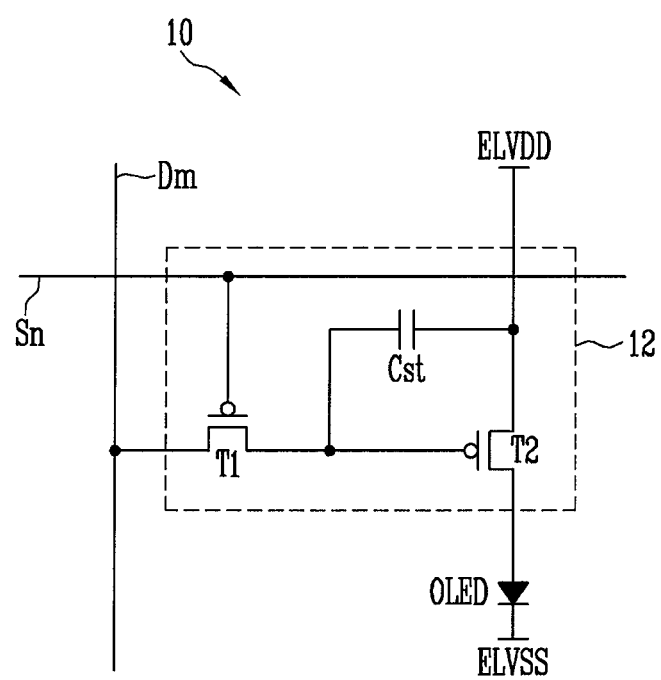
FIG. 2 is a circuit diagram illustrating an embodiment of a pixel shown in FIG. 1 according to an embodiment of the present invention.

FIG. 2 is a circuit diagram illustrating a pixel shown in FIG. 1 according to an embodiment of the present invention. Particularly, for convenience of illustration, a pixel coupled to an n-th scan line Sn and an m-th data line Dm will be shown in FIG. 2.

Referring to FIG. 2, the pixel 10 may include an organic light emitting diode OLED, and a pixel circuit 12 coupled to the data line Dm and the scan line Sn (e.g., the pixel circuit 12 is coupled at a crossing region of the data line Dm and the scan line Sn) to control the organic light emitting diode OLED.

An anode electrode of the organic light emitting diode OLED may be coupled to the pixel circuit 12, and a cathode electrode of the organic light emitting diode OLED may be coupled to the second voltage ELVSS.

The organic light emitting diode OLED may generate light with a luminance (e.g., a predetermined luminance) corresponding to the amount of current supplied from the pixel circuit 12.

The pixel circuit 12 may control the amount of current supplied to the organic light emitting diode OLED, corresponding to a data signal supplied to the data line Dm when a scan signal is supplied to the scan line Sn. To this end, the pixel circuit 12 may include a second pixel transistor T2 coupled between the first voltage ELVDD and the organic light emitting diode OLED, a first pixel transistor T1 coupled among (e.g., between) the second pixel transistor T2, the data line Dm and the scan line Sn, and a storage capacitor Cst coupled between a gate electrode and a first electrode of the second pixel transistor T2.

A gate electrode of the first pixel transistor T1 may be coupled to the scan line Sn, and a first electrode of the first pixel transistor T1 may be coupled to the data line Dm.

A second electrode of the first pixel transistor T1 may be coupled to one terminal of the storage capacitor Cst.

Here, the first electrode may be any one of source and drain electrodes (e.g., may be set as any one of source and drain electrodes), and the second electrode may be the other electrode different from the first electrode (e.g., may be set as the other electrode different from the first electrode). For example, when the first electrode is a source electrode, the second electrode may be a drain electrode.

The first pixel transistor T1 coupled to the scan line Sn and the data line Dm is turned on when a scan signal is supplied from the scan line Sn, to supply a data signal supplied from the data line Dm to the storage capacitor Cst. In this case, the storage capacitor Cst may charge a voltage corresponding to the data signal.

The gate electrode of the second pixel transistor T2 may be coupled to the one terminal of the storage capacitor Cst, and the first electrode of the second pixel transistor T2 may be coupled to the other terminal of the storage capacitor Cst and the first voltage ELVDD. A second electrode of the second pixel transistor T2 may be coupled to the anode electrode of the organic light emitting diode OLED.

The second pixel transistor T2 may control the amount of current flowing from the first voltage ELVDD to the second voltage ELVSS via the organic light emitting diode OLED, corresponding to the voltage stored in the storage capacitor Cst.

In this case, the organic light emitting diode OLED may generate light with a luminance corresponding to the amount of current supplied from the second pixel transistor T2.

The pixel structure of the pixel 10 in FIG. 2 described above is merely an embodiment of the present invention, and therefore, the pixel of embodiments of the present invention is not limited to the shown pixel structure. Actually, the pixel circuit 12 has a circuit structure capable of supplying current to the organic light emitting diode OLED, and may be selected as any one of various structures currently known in the art.

Figure 3:
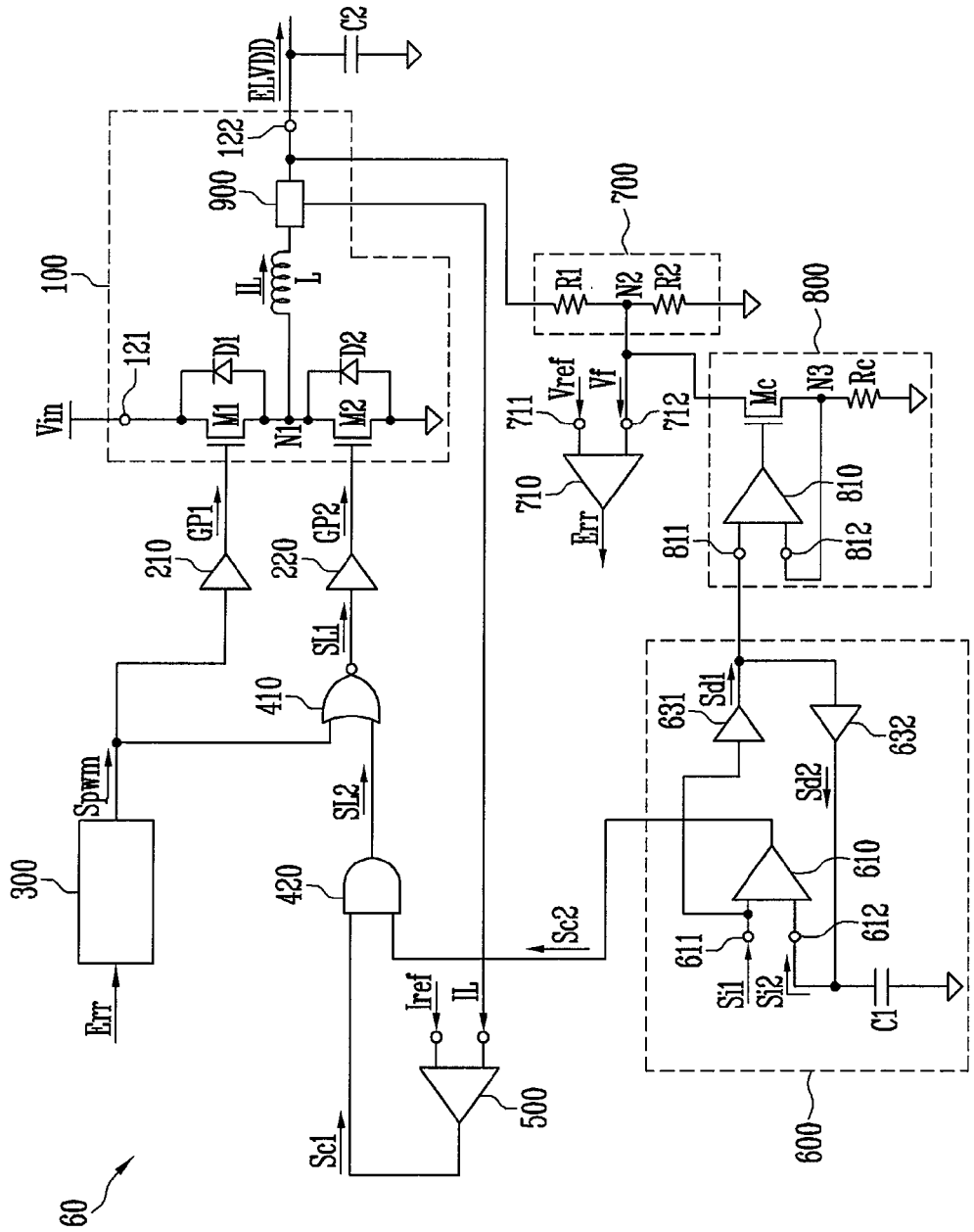
FIG. 3 is a diagram illustrating a DC-DC converter according to an embodiment of the present invention.
Figure 4:
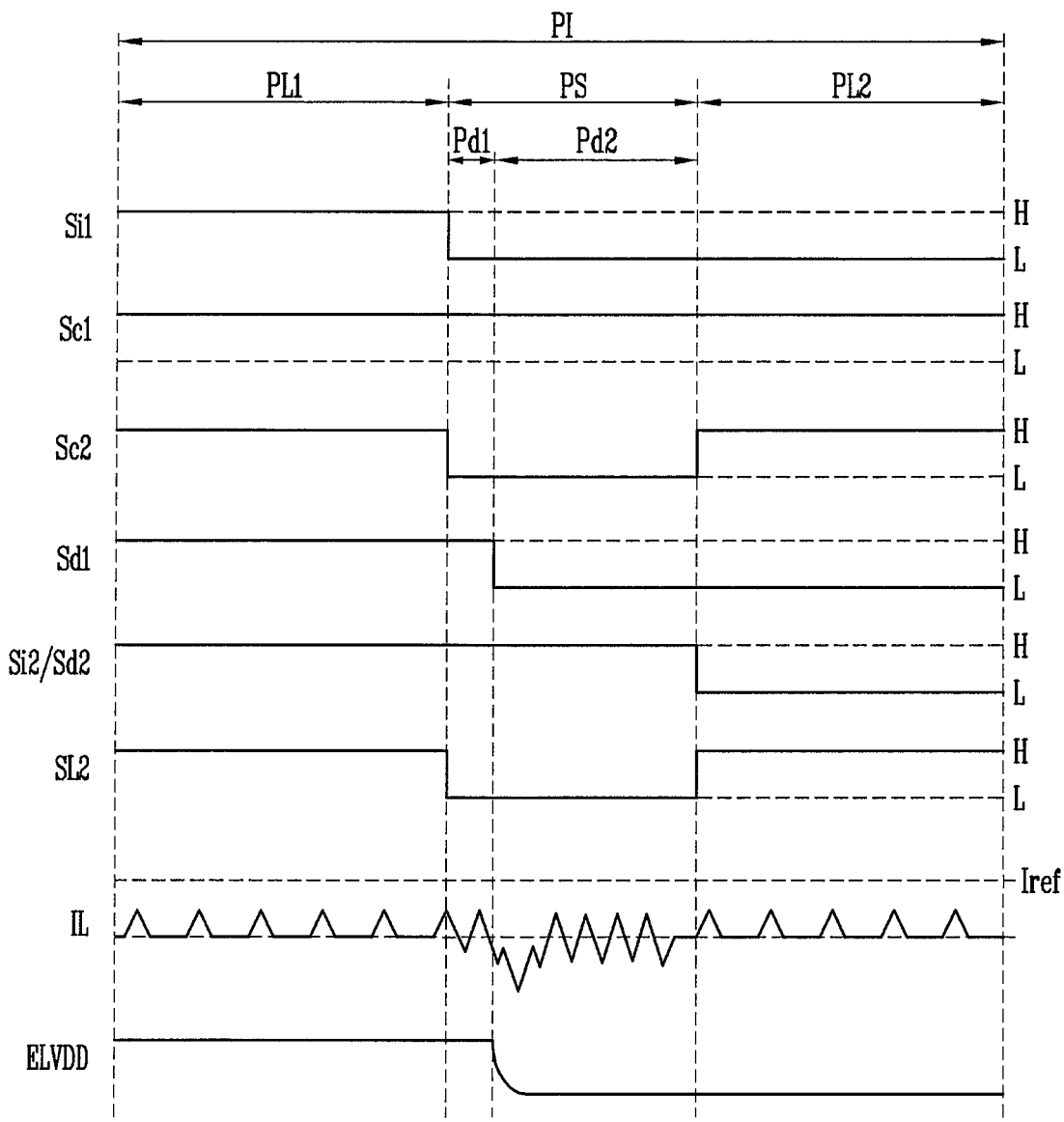
FIG. 4 is a waveform diagram illustrating an operation of the DC-DC converter according to an embodiment of the present invention.

FIG. 3 is a diagram illustrating a DC-DC converter according to an embodiment of the present invention. FIG. 4 is a waveform diagram illustrating an operation of the DC-DC converter according to an embodiment of the present invention.

Referring to FIG. 3, the DC-DC converter 60 according to this embodiment may include a converter 100, a first gate driver 210, a second gate driver 220, a pulse width modulation (PWM) control circuit 300, a first logic circuit 410 and a second logic circuit 420.

The converter 100 may include an input terminal 121 and an output terminal 122, and an input voltage Vin may be supplied to the input terminal 121. In this case, the converter 100 may convert the input voltage Vin into a first voltage ELVDD and output the converted first voltage ELVDD to the output terminal 122.

For example, the converter 100 may be a buck-converter, and accordingly, the first voltage ELVDD may have a voltage level lower than that of the input voltage Vin.

In order to stably maintain the first voltage ELVDD output to the output terminal 122 of the converter 100, a capacitor C2 may be coupled to the output terminal 122.

In order to perform the aforementioned operation, the converter 100 may include a first transistor M1, a second transistor M2 and an inductor L.

The first transistor M1 may be coupled between the input terminal 121 and a first node N1.

For example, a first electrode of the first transistor M1 may be coupled to the input terminal 121, and a second electrode of the first transistor M1 may be coupled to the first node N1.

The second transistor M2 may be coupled between the first node N1 and a ground.

For example, a first electrode of the second transistor M2 may be coupled to the first node N1, and a second electrode of the second transistor M2 may be coupled to the ground.

The inductor L may be coupled between the first node N1 and the output terminal 122.

In this case, the first node N1 may be defined as a common node of the first transistor M1, the second transistor M2 and the inductor L.

The first electrode of each of the first and second transistors M1 and M2 may be any one of source and drain electrodes (e.g., may be set as any one of source and drain electrodes), and the second electrode of each of the first and second transistors M1 and M2 may be the other electrode different from the first electrode (e.g., may be set as the other electrode different from the first electrode). For example, when the first electrode is a drain electrode, the second electrode may be a source electrode.

Additionally, the converter 100 may further include a first diode D1 and a second diode D2.

The first diode D1 may be coupled between the first node N1 and the input terminal 121. For example, an anode electrode of the first diode D1 may be coupled to the first node N1, and a cathode electrode of the first diode D1 may be coupled to the input terminal 121.

The second diode D2 may be coupled between the first node N1 and the ground. For example, an anode electrode of the second diode D2 may be coupled to the ground, and a cathode electrode of the second diode D2 may be coupled to the first node N1.

The first and second gate drivers 210 and 220 may respectively control the first and second transistors M1 and M2 included in the converter 100.

For example, the first gate driver 210 may receive a PWM signal Spwm supplied from the PWM control circuit 300, and supply a gate pulse GP1 corresponding to (or according to) the PWM signal Spwm to the gate electrode of the first transistor M1, thereby controlling a switching operation of the first transistor M1.

The second gate driver 220 may receive a first logic signal SL1 supplied from the first logic circuit 410, and supply a gate pulse GP2 corresponding to (or according to) the first logic signal SL1 to the gate electrode of the second transistor M2, thereby controlling a switching operation of the second transistor M2.

The first logic circuit 410 may receive the PWM signal Spwm supplied from the PWM control circuit 300, and receive a second logic signal SL2 supplied from the second logic circuit 420.

For example, the first logic circuit 410 may perform a logical operation on the PWM signal Spwm and the second logic signal SL2, and accordingly output the first logic signal SL1 to the second gate driver 220.

In this case, the first logic circuit 410 is a NOR gate.

The second logic circuit 420 may receive first and second control signal Sc1 and Sc2, and output the second logic signal SL2 to the first logic circuit 410.

For example, the second logic circuit 420 may perform a logical operation on the first and second control signals Sc1 and Sc2, and accordingly output the second logic signal SL2.

In this case, the second logic circuit 420 is an AND gate.

The DC-DC converter 60 according to this embodiment may further include a first comparator 500 configured to output the first control signal Sc1 to the second logic circuit 420.

The first comparator 500 may compare a first reference value (e.g., a predetermined first reference value) Iref with a current IL flowing in the inductor L, and output the first control signal Sc1 obtained based on (e.g., by reflecting) the compared result.

For example, when the current IL flowing in the inductor L is lower than the first reference value Iref, the first comparator 500 may output the first control signal Sc1 having a high logic level H. When the current IL flowing in the inductor L is higher than the first reference value Iref, the first comparator 500 may output the first control signal Sc1 having a low logic level L.

The current IL flowing in the inductor L included in the converter 100 may be measured by a current sensor 900.

For example, the current sensor 900 may measure the current IL flowing in the inductor L, and may supply the measured current IL to the first comparator 500.

Although it has been illustrated in FIG. 3 that the current sensor 900 is positioned between the inductor L and the output terminal 122, this is merely an embodiment, and the current sensor 900 may be at another position where the current sensor 900 can measure the current IL flowing in the inductor L.

The DC-DC converter 60 according to this embodiment may further include a voltage divider 700 and an error amplifier 710.

The voltage divider 700 may generate a feedback voltage Vf by dividing the first voltage ELVDD output from the converter 100, and supply the generated feedback voltage Vf to the error amplifier 710.

To this end, the voltage divider 700 may include a first resistor R1 and a second resistor R2.

For example, the first resistor R1 may be coupled between the output terminal 122 of the converter 100 and a second node N2.

The second resistor R2 may be coupled between the second node N2 and the ground.

The error amplifier 710 may receive a reference value (e.g., a predetermined reference value) Vref and the feedback voltage Vf, and supply, to the PWM control circuit 300, an error signal Err obtained based on (e.g., by reflecting) the difference between the second reference value Vref and the feedback voltage Vf.

To this end, the error amplifier 710 may include a first input terminal 711 configured to receive the second reference value Vref and a second input terminal 712 coupled to the second node N2.

The PWM control circuit 300 may supply the PWM signal Spwm for controlling switching operations of the first and second transistors M1 and M2 to the first gate driver 210 and the first logic circuit 410, respectively.

The PWM control circuit 300 may control the pulse width of the PWM signal Spwm based on (e.g., by reflecting) the error signal Err supplied from the error amplifier 710, and accordingly control the duty ratio of the first and second transistors M1 and M2.

The DC-DC converter 60 according to this embodiment may further include a controller 600 configured to output the second control signal Sc2 to the second logic circuit 420.

The controller 600 may include a second comparator 610. In this case, the second comparator 610 may receive a first input signal Si1 input to a first input terminal 611 thereof, and receive a second input signal Si2 input to a second input terminal 612 thereof.

The controller 600 may compare the received first and second input signals Si1 and Si2, and supply, to the second logic circuit 420, the second control signal Sc2 obtained based on (e.g., by reflecting) the compared result.

For example, when the level of the first input signal Si1 is lower than that of the second input signal Si2, the second comparator 610 may output the second control signal Sc2 having a low logic level L.

When the level of the first input signal Si1 is equal to that of the second input signal Si2, the second comparator 610 may output the second control signal Sc2 having a high logic level H.

The first input signal Si1 may be supplied from an outside of the DC-DC converter 60. For example, the timing controller 50 may supply the first input signal Si1 to the second comparator 610.

The controller 600 may further include a first delay buffer 631 and a second delay buffer 632.

The first delay buffer 631 may receive the first input signal Si1 supplied to the second comparator 610, and delay the first input signal Si1 by a specific period (e.g., a first period Pd1) and then output the delayed signal.

Thus, as shown in FIG. 4, an output signal Sd1 of the first delay buffer 631 may be delayed by the first period Pd1, as compared with the first input signal Si1.

The second delay buffer 632 may delay the signal Sd1 output from the first delay buffer 631 by a specific period (e.g., a second period Pd2), and output the delayed signal to the second input terminal 612 of the second comparator 610.

Thus, as shown in FIG. 4, an output signal Sd2 of the second delay buffer 632 may be delayed by the second period Pd2, as compared with the output signal Sd1 of the first delay buffer 631.

Therefore, the output signal Sd2 of the second delay buffer 632 becomes the second input signal Si2, to be input to the second input terminal 612 of the second comparator 610.

In order to stably maintain the second input signal Si2, a capacitor C1 may be coupled to the second input terminal 612 of the second comparator 610.

The DC-DC converter 60 according to this embodiment may further include a voltage controlled current source 800.

The voltage controlled current source 800 may control the feedback voltage Vf supplied from the voltage divider 700 to the error amplifier 710, according to the signal Sd1 output from the first delay buffer 631.

For example, the voltage controlled current source 800 may include a control transistor Mc, a resistor Rc and a control amplifier 810.

The control transistor Mc may be coupled to the second node N2 and a third node N3.

For example, a first electrode of the control transistor Mc may be coupled to the second node N2, and a second electrode of the control transistor Mc may be coupled to the third node N3.

In this case, the second node N2 may be defined as a common node of the second input terminal 712 of the error amplifier 710, the first resistor R1, the second resistor R2 and the control transistor Mc.

The first electrode of the control transistor Mc may be any one of source and drain electrodes (e.g., may be set as any one of source and drain electrodes), and the second electrode of the control transistor Mc may be the other electrode different from the first electrode (e.g., may be set as the other electrode different from the first electrode). For example, when the first electrode is a drain electrode, the second electrode may be a source electrode.

The resistor Rc may be coupled between the third node N3 and the ground.

The control amplifier 810 may control the amount of current of the control transistor Mc, according to the signal Sd1 output from the first delay buffer 631.

To this end, the control amplifier 810 may include a first input terminal 811 coupled to the output terminal of the first delay buffer 631, and a second input terminal 812 coupled to the third node N3.

Thus, the output terminal of the first delay buffer 631 and the input terminal of the second delay buffer 632 may be coupled to the first input terminal 811 of the control amplifier 810.

The third node N3 may be defined as a common node of the second input terminal 812 of the control amplifier 810, the control transistor Mc and the resistor Rc.

The voltage controlled current source 800 may control the feedback voltage Vf of the voltage divider 700, according to the first input signal Si1 input from the outside. Accordingly, the voltage controlled current source 800 may also control the first voltage ELVDD output from the converter 100.

For example, when the first input signal Si1 is changed from the high logic level H into the low logic level L, the output signal Sd1 of the first delay buffer 631 may be changed from the high logic level H into the low logic level L after a period PD1 (e.g., a predetermined period PD1) from when the first input signal Si1 is changed from the high logic level H into the low logic level L.

Therefore, the amount of current from the control transistor Mc is decreased, and thus the feedback voltage Vf may be increased.

Accordingly, the difference between the feedback voltage Vf and the second reference value Vref is further increased. This may be reported to the PWM control circuit 300 by the error signal Err of the error amplifier 710.

The PWM control circuit 300 may control the pulse width of the PWM signal Spwm to decrease the first voltage ELVDD based on (e.g., by reflecting) the error signal Err.

When the first input signal Si1 is changed from the low logic level L into the high logic level H, the output signal Sd1 of the first delay buffer 631 may be changed from the low logic level L into the high logic level H after the period PD1 (e.g., the predetermined period PD1) from when the first input signal Si1 is changed from the low logic level L into the high logic level H.

Therefore, the amount of current from the control transistor Mc is increased, and thus the feedback voltage Vf may be decreased.

Accordingly, the difference between the feedback voltage Vf and the second reference value Vref is further decreased. This may be reported to the PWM control circuit 300 by the error signal Err of the error amplifier 710.

The PWM control circuit 300 may control the pulse width of the PWM signal Spwm to increase the first voltage ELVDD based on (e.g., by reflecting) the error signal Err.

Hereinafter, a driving operation of the DC-DC converter 60 according to this embodiment will be described in detail with reference to FIG. 4.

When a heavy load exists (e.g., when the current IL flowing in the inductor L is no less than the first reference value Iref), the buck-type converter 100 shown in FIG. 3 may operate in a continuous conduction mode CCM.

In the CCM, the first and second transistors M1 and M2 are synchronized with each other, thereby performing an on-off operation.

When a light load exists (e.g., when the current IL flowing in the inductor L is less than the first reference value Iref), the converter 100 may operate in a discontinuous conduction mode (DCM).

In order to reduce power consumption in the DCM, the second transistor M2 is maintained in the turn-off state, and the first transistor M1 performs an on-off operation.

Since the first transistor M1 performs a switching operation in the DCM, the output voltage ELVDD of the converter 100 can be quickly raised.

On the other hand, it is difficult to quickly drop the output voltage ELVDD in the DCM.

That is, since the second transistor M2 maintains the turn-off state in the DCM, electric charges of the output terminal 122 may be flowed out (e.g., transmitted) through the resistor R1 or R2 of the voltage divider 700 when the output voltage ELVDD of the converter 100 is dropped.

Further, since the resistor R1 or R2 of the voltage divider 700 generally has a large resistance value, it takes a considerably long time to drop the output voltage ELVDD of the converter 100.

Accordingly, in order to solve such a problem, the DC-DC converter 60 according to this embodiment inserts a synchronization mode period PS into a low current period PI, so that it is possible to quickly drop the output voltage ELVDD of the converter 100.

Referring to FIG. 4, the low current period PI in which the current IL flowing in the inductor L is lower than (e.g., maintained lower than) the first reference value Iref may include a first light load mode period PL1, a synchronization mode period PS and a second light load mode period PL2.

In this case, the first light load mode period PL1, the synchronization mode period PS and the second light load mode period PL2 may be sequentially performed.

For example, in the first light load mode period PL1, the first transistor M1 may repetitively perform an on-off operation, and the second transistor M2 may maintain the turn-off state.

Accordingly, the DC-DC converter 60 may operate in the DCM during the first light load mode period PL1.

In the synchronization mode period PS, the first and second transistors M1 and M2 may be synchronized with each other, to alternately perform a turn-on operation.

Accordingly, the DC-DC converter 60 may operate in the CCM during the synchronization mode period PS.

In the second light load mode period PL2, the first transistor M1 may repetitively perform an on-off operation, and the second transistor M2 may maintain the turn-off state.

Accordingly, the DC-DC converter 60 may operate in the DCM during the second light load mode period PL2.

In order to perform the aforementioned operation, the controller 600 according to this embodiment may output the second control signal Sc2 having the high logic level H during the first and second light load mode periods PL1 and PL2, and output the second control signal Sc2 having the low logic level L during the synchronization mode period PS.

Since the current IL flowing in the inductor L is lower (e.g., maintained lower) than the first reference value Iref, the first comparator 500 may output the first control signal Sc1 having a high logic level H during the low current period PI.

The first input signal Si1 may maintain a constant state during the first light load mode period PL1 and during a period (e.g., a considerable period) before the first light load mode period PL1.

Accordingly, the first and second input signals Si1 and Si2 input to the second comparator 610 may have the same level during the first light load mode period PL1.

Thus, the second comparator 610 may output the second control signal Sc2 having the high logic level H during the first light load mode period PL1.

During the first light load mode period PL1, the first control signal Sc1 having the high logic level H and the second control signal Sc2 having the high logic level H may be input to the second logic circuit 420.

Thus, the second logic circuit 420 performing the AND logic operation may output the second logic signal SL2 having the high logic level H during the first light load mode period PL1.

Accordingly, the second logic signal having the high logic level H is input to the first logic circuit 410, and thus the first logic circuit 410 performing the NOR logic operation may output the first logic signal SL1 having the low logic level L during the first light load mode period PL1, regardless of the level of the PWM signal Spwm.

Therefore, the second gate driver 220 allows the second transistor M2 to be maintained in the turn-off state during the first light load mode period PL1, according to the first logic signal SL1 having the low logic level L.

In this case, the first gate driver 210 may control the on-off operation of the first transistor M1 during the first light load mode period PL1, according to the PWM signal Spwm supplied from the PWM control circuit 300.

Thus, the DC-DC converter 60 according to this embodiment may operate in the DCM during the first light load mode period PL1.

The first input signal Si1 is changed from the high logic level H into the low logic level L, thereby entering into the synchronization mode period PS.

Accordingly, the level of the first input signal Si1 becomes lower than that of the second input signal Si2, and thus the second comparator 610 may output the second control signal Sc2 having the low logic level L during the synchronization mode period PS.

Therefore, during the synchronization mode period PS, the first control signal Sc1 having the high logic level H and the second control signal Sc2 having the low logic level L may be input to the second logic circuit 420.

Thus, the second logic circuit 420 performing the AND logic operation may output the second logic signal SL2 having the low logic level during the synchronization mode period PS.

Since the second logic signal SL2 having the low logic level L is input to the first logic circuit 410, the first logic circuit 410 performing the NOR logic operation may output the first logic signal SL1 having a level opposite to that of the PWM signal Spwm.

Accordingly, the first and second gate drivers 210 and 220 may control the first and second transistors M1 and M2 to be alternately turned on during the synchronization mode period PS.

Thus, the DC-DC converter 60 according to this embodiment may operate in the CCM during the synchronization mode period PS.

The first delay buffer 631 delays the first input signal Si1 by the first period Pd1 and outputs the delayed signal. Therefore, when the first input signal Si1 is changed from the high logic level H into the low logic level L, the output signal Sd1 of the first delay buffer 631 may be changed from the high logic level H into the low logic level L at the time when the first period Pd1 elapses from the time when the first input signal Si1 is changed from the high logic level H into the low logic level L.

As the output signal Sd1 of the first delay buffer 631 is changed from the high logic level H into the low logic level L, the level of the first voltage ELVDD output from the converter 100 may be quickly or rapidly dropped.

That is, as the synchronization mode period PS in the low current period PI is forcibly performed, and the output signal Sd1 of the first delay buffer 631 is changed from the high logic level H into the low logic level L in the synchronization mode period PS, electric charges of the output terminal 122 may be flowed out (e.g., transmitted) through the second transistor M2.

The second delay buffer 632 delays the signal Sd1 output from the first delay buffer 631 by the second period Pd2 and outputs the delayed signal. Therefore, when the output signal Sd1 of the first delay buffer 631 is changed from the high logic level H into the low logic level L, the output signal Sd2 of the second delay buffer 632 may be changed from the high logic level H into the low logic level L at the time when the second period Pd2 elapses from the time when the output signal Sd1 of the first delay buffer 631 is changed from the high logic level H into the low logic level L.

In this case, the output signal Sd2 of the second delay buffer 632 performs the function of the second input signal Si2, and therefore, the first and second input signals Si1 and Si2 have the same level.

Thus, the second comparator 610 may output the second control signal Sc2 having the high logic level H.

As the second control signal Sc2 is changed from the low logic level L into the high logic level H, the synchronization mode period PS is finished, thereby entering into the second light load mode period PL2.

The second control signal Sc2 output from the second comparator 610 during the second light load mode period PL2 is similar (or equal) to the second control signal Sc2 of the first light load mode period PL1 described above. Thus, during the second light load mode period PL2, the first and second transistors M1 and M2 may operate similarly (or equally) to the first and second transistors M1 and M2 during the first light load mode period PL1.

By way of summation and review, according to embodiments of the present invention, it is possible to provide a DC-DC converter and a display device including the same, which can reduce power consumption and can quickly change the output voltage of the DC-DC converter.

Example embodiments of the present invention have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and equivalents thereof.

What is claimed is:

1. A DC-DC converter comprising:
   a converter comprising a first transistor, a second transistor and an inductor;
   a first gate driver and a second gate driver configured to respectively control the first and second transistors;
   a pulse width modulation (PWM) control circuit configured to output a PWM signal to the first gate driver and a first logic circuit, the first logic circuit configured to receive the PWM signal and a second logic signal, and to output a first logic signal to the second gate driver;
   a second logic circuit configured to receive a first control signal and a second control signal, and to output the second logic signal to the first logic circuit; and
   a first comparator configured to compare a first reference value with current in the inductor, and to output, to the second logic circuit, the first control signal based on a compared result of the first comparator.

2. The DC-DC converter of claim 1, wherein the first comparator is configured to output the first control signal having a high logic level when the current in the inductor is lower than the first reference value, and to output the first control signal having a low logic level when the current in the inductor is higher than the first reference value.

3. The DC-DC converter of claim 1, further comprising a current sensor configured to measure current in the inductor, and to supply the measured current to the first comparator.

4. The DC-DC converter of claim 1, further comprising a controller configured to output the second control signal to the second logic circuit.

5. The DC-DC converter of claim 4, wherein a low current period in which the current in the inductor is lower than the first reference value comprises a first light load mode period, a synchronization mode period and a second light load mode period, which are sequentially performed.

6. The DC-DC converter of claim 5, wherein, during the first light load mode period, the first transistor is configured to repetitively perform an on-off operation, and the second transistor is configured to be in a turn-off state,
   wherein, during the synchronization mode period, the first and second transistors are configured to be alternately turned on, and
   wherein, during the second light load mode period, the first transistor is configured to repetitively perform the on-off operation, and the second transistor is configured to be in the turn-off state.

7. The DC-DC converter of claim 6, wherein the controller is configured to output the second control signal having a high logic level during the first and second light load mode periods, and to output the second control signal having a low logic level during the synchronization mode period.

8. The DC-DC converter of claim 7, wherein the first logic circuit comprises a NOR gate, and
   wherein the second logic circuit comprises an AND gate.

9. The DC-DC converter of claim 4, wherein the controller comprises a second comparator configured to compare a first input signal input to a first input terminal thereof with a second input signal input to a second input terminal thereof, and to supply, to the second logic circuit, the second control signal based on a compared result of the second comparator.

10. The DC-DC converter of claim 9, wherein the second comparator is configured to output the second control signal having a low logic level when a level of the first input signal is lower than that of the second input signal, and to output the second control signal having a high logic level when a level of the first input signal is equal to that of the second input signal.

11. The DC-DC converter of claim 9, wherein the controller further comprises a first delay buffer configured to receive the first input signal to delay the received first input signal by a period and to output the delayed signal, and a second delay buffer configured to receive a signal output from the first delay buffer to delay the received signal by a period and to output the delayed signal to the second input terminal of the second comparator.

12. The DC-DC converter of claim 11, wherein the controller further comprises a capacitor coupled to the second input terminal of the second comparator.

13. The DC-DC converter of claim 11, wherein the converter is configured to receive an input voltage at an input terminal thereof, and to output a first voltage to an output terminal thereof,
   wherein the first transistor is coupled between the input terminal and a first node,
   wherein the second transistor is coupled between the first node and ground, and
   wherein the inductor is coupled between the first node and the output terminal.

14. The DC-DC converter of claim 13, further comprising:
   a voltage divider configured to generate a feedback voltage by dividing the first voltage, and to supply the generated feedback voltage to an error amplifier, the error amplifier configured to supply, to the PWM control circuit, an error signal based on a difference between the feedback voltage and a second reference value.

15. The DC-DC converter of claim 14, further comprising a voltage controlled current source configured to control the feedback voltage according to the signal output from the first delay buffer.

16. The DC-DC converter of claim 15, wherein the voltage divider comprises a first resistor coupled between the output terminal of the converter and a second node, and a second resistor coupled between the second node and ground, and
   wherein the error amplifier comprises a first input terminal to which the second reference value is input, and a second input terminal coupled to the second node.

17. The DC-DC converter of claim 16, wherein the voltage controlled current source comprises a control transistor coupled between the second node and a third node, a resistor coupled between the third node and ground, and a control amplifier configured to control an amount of current from the control transistor according to the signal output from the first delay buffer.

18. The DC-DC converter of claim 17, wherein the control amplifier comprises a first input terminal coupled to the output terminal of the first delay buffer, and a second input terminal coupled to the third node.

19. A display device comprising:
- a display unit comprising a plurality of pixels;
- a scan driver for providing scan signals to the pixels;
- a data driver for providing data signals to the pixels in synchronization with the scan signals; and
- a DC-DC converter for providing power to the display unit, the DC-DC converter comprising:
  - a converter comprising a first transistor, a second transistor and an inductor;
  - a first gate driver and a second gate driver configured to respectively control the first and second transistors;
  - a pulse width modulation (PWM) control circuit configured to output a PWM signal to the first gate driver and a first logic circuit, the first logic circuit configured to receive the PWM signal and a second logic signal, and to output a first logic signal to the second gate driver;
  - a second logic circuit configured to receive a first control signal and a second control signal, and to output the second logic signal to the first logic circuit; and
  - a first comparator configured to compare a first reference value with current in the inductor, and to output, to the second logic circuit, the first control signal based on a compared result of the first comparator.

* * * * *